United States Patent [11] 3,615,187

[72] Inventors Yuichi Suzukawa;
  Hisashi Kono; Kenji Terai; Muneki Saito,
  all of Ube-shi, Japan
[21] Appl. No. 857,449
[22] Filed Sept. 12, 1969
[45] Patented Oct. 26, 1971
[73] Assignee Ube Industries, Ltd.
  Ube-shi, Japan
[32] Priority Sept. 17, 1968
[33] Japan
[31] 43/66627

[54] PROCESS FOR THE PRODUCTION OF SPHERICAL ALUMINA-SILICA-CONTAINING SOLID PARTICLES WHICH ARE PREDOMINANTLY MULLITE
7 Claims, 1 Drawing Fig.

[52] U.S. Cl. .................................................. 23/110 R,
   23/1 F, 23/201
[51] Int. Cl. ......................................................... C01b 33/26
[50] Field of Search ............................................. 23/110, 1 F,
   201, 182

[56] References Cited
UNITED STATES PATENTS

| | | | |
|---|---|---|---|
| 2,678,282 | 5/1954 | Jones ............................. | 23/110 X |
| 2,970,889 | 2/1961 | Ishino ........................... | 23/110 |
| 3,213,038 | 10/1965 | Chomitz ....................... | 23/110 X |

*Primary Examiner*—Edward Stern
*Attorney*—Sherman and Shalloway

ABSTRACT: A process for producing spherical alumina-silica-containing solid particles which comprises introducing a powdered raw material (A) containing alumina and silica as well as a compound selected from the group consisting of magnesia and magnesium compounds capable of forming magnesia under burning conditions to a fluidized bed with the forced circulation flow of the solid particles, in the presence of a solid seed material (B) having a particle diameter one-tenth to two-thirds that of the product particles and consisting essentially of silica, alumina and magnesia; burning said powdered raw material (A) and said seed material (B) in said fluidized bed to coat said seed material (B) with said powdered raw material (A); and thereafter recovering the resulting solid particles which are predominantly mullite.

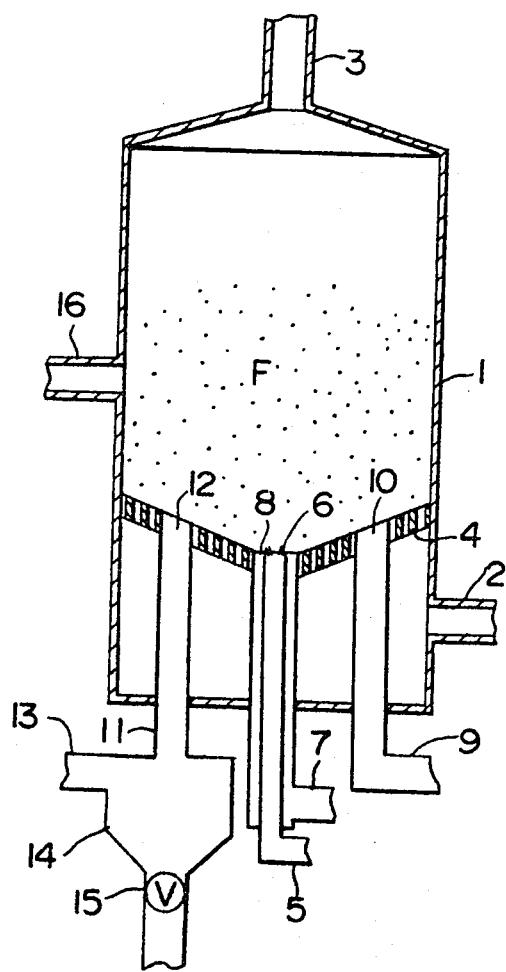

PROCESS FOR THE PRODUCTION OF SPHERICAL ALUMINA-SILICA-CONTAINING SOLID PARTICLES WHICH ARE PREDOMINANTLY MULLITE

This invention relates to a process for producing from powdered raw materials consisting predominantly of alumina and silica, spherical alumina-silica-containing solid particles which are predominantly mullite, the production being carried out in a fluidized bed with the forced circulation flow of the solid particles. More specifically, the invention relates to a process for the production of spherical alumina-silica-containing solid particles which are predominantly mullite, which comprises burning in the aforesaid fluidized bed in the presence of a solid seed material, a powdered raw material containing alumina and silica in a proportion of respectively 40–80 weight percent and 15–58 weight percent as well as magnesia, or a magnesium compound capable of forming magnesia under burning conditions, in an amount of 2–5 weight percent, calculated as MgO.

The term "alumina-silica-containing material," as referred to herein and in the appended claims, is meant to embrace a composition which consists essentially of alumina and silica and which may contain in addition small amounts of oxides of alkali metals, such as $Na_2O$ and $K_2O$, oxides of alkaline earth metals, such as CaO and MgO, and oxides of other metals, such as $Fe_2O_3$.

As a process for commercially producing the alumina-silica-containing particles, e.g. mullite particles, that is known is one wherein a large mass of mullite is produced by a method in which a mixed material consisting of prescribed amounts of alumina ($Al_2O_3$) and silica ($SiO_2$) is melted by heating at an elevated temperature and the so obtained large mass is ground into particles. Since the mullite particles of desired particle size are obtained by melting the starting mixture of alumina and silica at a temperature above about 1800° C. and then grinding the resulting large mass of mullite, the yield of the product particles as well as their form is poor. In addition, there is also the shortcoming that a large amount of electric power is required for the melting operation.

While the aluminia-silica-containing solid particles have been used in the past principally as aggregate of refractory brick, it also possesses excellent properties as a heat carrier as well as catalyst carrier.

However, since the shape of the mullite particles obtained by grinding as in the conventional process is poor, they have the drawback that when they are used as a heat carrier, for instance, in a fluidized bed, excessive abrasion of the apparatus results. Furthermore, they are unable to form a satisfactory fluidized bed.

We found that by adding to a powdered raw material consisting predominantly of silica and alumina, 2–5 weight percent, calculated as MgO based on the total raw material, of magnesia or a magnesium compound capable of forming magnesia under burning conditions, and burning this powdered raw material at a temperature of 1200–1600° C. in a fluidized bed with the forced circulation flow of the solid particles, in the presence of a solid seed material consisting essentially of silica, alumina and magnesia, the powdered raw material coats the seed material to provide continuously and economically alumina-silica-containing solid particles which are predominantly of mullite and nearly spherical in form.

Thus, a process for producing spherical alumina-silica-containing solid particles is provided according to the present invention, said process comprising feeding a powdered raw material (A) containing alumina and silica in a proportion of respectively 40–80 weight percent and 15–58 weight percent, as well as magnesia, or a magnesium compound capable of forming magnesia under burning conditions, in an amount of 2–5 weight percent, calculated as MgO, to a fluidized bed with the forced circulation flow of the solid particles, in the presence of a solid seed material (B) having a particle diameter one-tenth to two-thirds that of the product particles and consisting essentially of silica, alumina and magnesia; burning said powdered raw material (A) and seed material (B) in said fluidized bed at a temperature of 1200–1600° C. to coat said powdered raw material (A) on the seed material (B); and thereafter recovering the resulting solid particles of predominantly mullite having a particle diameter of 0.5–10 mm.

As the alumina component to be used as raw material in this invention, included are such as, for example, aluminum oxide, alumina gel and aluminum hydroxide. On the other hand, as the silica component, usable are such as, for example, silicic anhydride and quartzite. Instead of using a mixture of the separate components alumina and silica, it is also possible to use a raw material containing the two components, such as, for example, sillimanite, kaolin and alumina-silica gel. It is preferred that the raw materials are used after being ground as finely as possible, for instance, to such an extent that the residue on 170 mesh Tyler sieve is less than 10 percent.

For forming the mullite the amounts contained in the powdered raw material of the alumina and silica should be in a proportion, based on the whole powdered raw material, of 40–80 weight percent, preferably 55–70 weight percent, $Al_2O_3$, and 15–58 weight percent, preferably 25–43 weight percent, $SiO_2$.

We found that when a magnesium component in an amount of 2–5 percent by weight, calculated as MgO, was added to the powdered raw material consisting principally of alumina and silica in the production of the alumina-silica-containing solid particles in a fluidized bed, the formation of mullite could be accomplished at a lower temperature than that considered necessary for the formation of mullite hitherto, i.e. 1200°–1600° C., and the amount of the liquid molten phase of the material during the burning operation could be maintained within a range of 10–35 percent, with the consequence that it was possible to form spherical alumina-silica-containing solid particles predominantly of mullite by coating the powdered raw material on the surface of the seed material, i.e. the fluidized bed functions as a type of elevated temperature granulator in this case, the granulation taking place simultaneously with the sintering reaction, with the solid particles of the fluidized bed as the seed. As the magnesium compound to be used in the present invention, included are those which are capable of forming magnesia under burning conditions, such as, for example, the magnesium oxides as light calcined magnesia, sea water magnesia clinkers and natural magnesia minerals, as well as magnesium hydroxide and magnesium carbonate.

For maintaining the foregoing liquid phase amount which was indicated as being desirable, an addition of MgO to the powdered raw material so as to be contained therein in an amount of 2–5 percent will do. When the amount added is insufficient, the amount of liquid phase formed is inadequate, with the consequence that the granulation effect declines, whereas too great an amount becomes the cause of agglomeration of the product particles.

The seed material (B) to be used in the invention process is not imposed with any limitations as long as it consists of solid particles which are essentially composed of silica, alumina and magnesia and are of particle size one-tenth to two-thirds of the product particle diameter (0.5–10 mm.). However, it is preferred that it is of a chemical composition identical or nearly identical to that of the powdered raw material used. Useable as such a seed material is one obtained by molding the aforesaid powdered raw material (A) into spherical or cylindrical shape, using, for example, a dish type granulator, a fluidizing type granulator, a spray dryer or tablet machine, followed by removal of the moisture content from the particles by drying. It is also possible to use as the foregoing seed material (B) those particles of relatively smaller size that are contained in the product obtained by the invention process. Alternatively, the lumps of silica-alumina-magnesia sintered material obtained by conventional processes or the product obtained by the invention process whose particle diameters are large can be used as the seed material (B) after they have been crushed and sieved to adjust the particle size to the before-indicated diameter.

While the proportion of the seed material (B) to the powdered raw material (A) will vary depending upon such factors as the average particle diameter of the seed material, mean residence time in bed of the powdered raw material and the average particle diameter of the product withdrawn from the system, generally speaking, it is desirable that 1 to 10 weight parts, and preferably 2-7 weight parts, of powdered raw material (A) is used to one weight part of seed material (B).

Seed material (B) can be fed to the fluidized bed either separately from the powdered raw material (A) or as a mixture with the latter.

A fluidized bed with the forced circulation flow of solid particles is used in the present invention. This fluidized bed is so arranged that a fluidizing gas is introduced into the fluidized bed through a gas distributor disposed in the bottom part of the fluidized bed at a gas velocity sufficient to fluidize the solid particles in the bed, while at the same time a gas jet stream is injected into said fluidized bed from an injection opening for the gas jet stream at a rate higher than the superficial gas velocity Uo in the empty tower. Thus the fluidization of the solid particles in the bed and their forced circulation flow are achieved.

Since in the case of a fluidized bed the solid particles in the bed move about actively, this type of bed is usually superior to the packed, fixed or moving bed in its uniformity and controllability of the bed temperature. Hence, it is employed with effectiveness in the case of the sintering reaction of solid substances and reactions requiring temperature control. However, in the case where a liquid phase is formed during burning as in the case of the sintering reaction of a solid substance as, for example, in the manufacture of alumina-silica-containing solid particles from raw materials predominantly of alumina and silica in a fluidized bed, there is usually a tendency toward agglomeration, i.e., adhering of the particles to each other in the bed or adhering of the particles to the wall or bottom of the furnace, and hence it is difficult to form a stable fluidized bed as well as to obtain sintered material of practically spherical shape. According to our investigations, we found that the formation of an excess of the liquid phase on the particle surface during the sintering reaction was one of the principal causes of the agglomeration phenomenon and that it was necessary to control the amount of the liquid phase of the particles to 10-35 percent, and preferably 15-25 percent, to prevent the agglomeration of the particles and to grow the particles.

Now, when the powdered raw material and the seed material of the hereinbefore noted composition are used and when they are burned in a fluidized bed with the forced circulation flow of the solid particles, the powdered raw material fed becomes coated on the surface of the seed material and at the same time the burnt particulate product becomes substantially spherical in form while gradually increasing its diameter. Hence, the excessive agglomeration of the solid particles or the phenomenon of adhering of the particles to the wall and bottom of the furnace can be effectively prevented.

According to the invention process, the powdered raw material (A) is burned in the hereinbefore described fluidized bed at a temperature of 1200-1600° C. in the presence of seed material (B). When the burning temperature is lower than 1200° C., growth of the size of the solid particles cannot be expected. On the other hand, the use of elevated temperatures exceeding 1600° C. does not provide any more enhanced effects relative to the growth of the particle size, and it is disadvantageous from the standpoint of heat economy and the durability of the furnace material. For maintaining the burning temperature within the range of 1200-1600° C., the burning of a fuel in the fluidized bed will do. As the fuel, any of such liquid fuels as heavy oil, kerosene and light oil, and such gaseous fuels as liquified propane, liquified butane and natural gas can be used. Use of liquid fuels is more advantageous, since use of gaseous fuels sometime results in occurrence of the so-called blowthrough phenomenon in the fluidized bed.

The invention process will now be described with reference to the accompanying drawing, which is a schematic sectional view illustrating an example of an apparatus employed for practicing the invention process.

In the drawing, a gas distributor 4 of an inverted conical configuration is disposed inside a furnace 1 at its lower portion but with a distance from the bottom thereof. On the wall of the furnace 1 positioned below the gas distributor 4, there is provided a fluidizing gas inlet 2 for introducing the fluidizing gas, and a gas exhaust port 3 is provided on the top of the furnace 1. At the central portion of the gas distributor 4 there is disposed a fuel injection nozzle 6 opening toward the fluidized bed F and being connected with a vertical fuel feed pipe 5. A gas jet stream feed pipe 7 is disposed coaxially with the fuel feed pipe 5 so as to surround it. The gas jet stream is introduced into the fluidized bed F through a gas jet stream injection opening 8. A powdered raw material feed opening 10 which is connected with a powdered raw material feed pipe 9, and a selective discharge opening 12 for the selective discharge of product particles which is connected with a vertical selective discharge of product particles which is connected with a vertical selective discharge pipe 11 for the selective discharge of product particles are provided through the gas distributor 4 at the positions other than the central portion thereof. The lower end of the selective discharge pipe 11 is opened toward a product hopper 14. At the lower portion of the product hopper 14 there is provided a valve 15 for recovering product particles. A selective discharge gas inlet 13 for feeding the selective discharge gas is disposed on the sidewall of the product hopper 14. A solid seed material feed pipe 16 is provided on the wall of the furnace 1 at the position above the gas distributor 4. The gas distributor 4, which is usually provided with numerous perforations 0.1-10 mm. in diameter, is preferably one in which the pressure loss of the gas when passing through the gas distributor 4 is usually 100-500 mm. $H_2O$.

The gas distributor 4 may be one which is flat in configuration, but preferred is that of inverted conical configuration, i.e., one which inclines centripetally with the center being in the lowermost position. And in this case, the angle of inclination of about 45° is most preferred.

In practicing the invention process by employing the apparatus illustrated in the drawing, the oxygen-containing gas is introduced from the fluidizing gas inlet 2 into the furnace 1 through the gas distributor 4.

Next, the solid seed material is introduced into the furnace 1 from the solid seed material feed pipe 16. The solid particles form a fluidizing bed F in the furnace 1.

Fuel is then fed into the furnace 1 from the fuel injection nozzle 6 via the fuel feed pipe 5. At the same time, an oxygen-containing gas jet stream is fed into the furnace 1 from the gas jet stream injection opening 8 to burn the fuel and at the same time cause the forced circulation flow of the solid particles in the furnace 1.

The superficial gas velocity Uo in the empty tower in the fluidized bed used in the invention process will vary in this case depending upon the average particle diameter and the diameter distribution of the solid particles in the bed but, generally speaking, it is desirable that the superficial gas velocity Uo is within a range of 2-10 meters per second, especially 3-8 meters per second. Further, the ratio of the amount $V_f$ Nm³/hr. of fluidizing gas flowing through the gas distributor to the amount Vo Nm³/hr. of total gas fed into the fluidizing bed Vo Nm³/hr., i.e. the value of $V_f/Vo$, is usually preferably within the range of 0.3-0.6, though it varies considerably depending upon the operating conditions. The velocity $U_j$ of the gas jet stream at the injection opening should be made greater than the superficial gas velocity Uo in the empty tower and is preferably within the range of 15- 30 meters per second. Furthermore, the ratio of the amount $V_j$ of flow of the gas jet stream to the aforesaid Vo, i.e. the value of $V_j/Vo$ is preferably within the range of 0.2-0.4.

As a result of the combustion of the fuel, the temperature of the fluidized bed F is maintained at the hereinbefore noted burning temperature required for the manufacture of the alumina-silica-containing solid particles. The burning temperature can be regulated as desired by varying either the ratio of amount of raw material fed to amount of fuel fed or the amount of an oxygen-containing gas.

Next, the powdered raw material predominantly of alumina and silica and containing a magnesium compound is introduced via a powdered raw material feed pipe 9 into the furnace 1 from a powdered raw material feed opening 10 along with an oxygen-containing gas, and the burning of the raw material is carried out.

The velocity $Ur$ of the gas for feeding the powdered raw material, which is greater than the superficial gas velocity $Uo$ in the empty tower but must be less than the velocity $U_j$ of the gas jet stream, is suitably in a range of usually 10–20 meters per second.

The raw material fed, while undergoing a sintering reaction, adheres to the surface of the fluidized solid particles to become coated thereon.

Only those alumina-silica-containing particles which have grown according to formation of the coating of the raw material on the seed solid particles and have attained a particle size larger than that prescribed are allowed to fall down through a selective discharge pipe 11 via a selective discharge opening 12 into a product hopper 14 by means of a selective discharge gas introduced from a selective discharge gas inlet 13. Thus, the product alumina-silica-containing particles of practically spherical shape and of nearly uniform size are stored in the product hopper 14. The product silica-alumina-containing particles are removed from the system by opening a valve 15.

When the operation is to be carried out continuously, the powdered raw material and the solid seed materials are continuously fed to the furnace 1.

Further, the average particle diameter of the product alumina-silica-containing particles can be adjusted to the desired particle diameter, i.e., a particle diameter of 0.5–10 mm., and preferably 1–5 mm., by controlling the velocity of the selective discharge gas which after being introduced from the selective discharge gas inlet 13 travels via the selective discharge pipe 11 and is injected into the furnace 1 from the selective discharge opening 12.

While the velocity $Us$ of the selective discharge gas will depend upon the average particle diameter of the solid particles in the bed and the state of fluidization, the operation is usually carried out with this velocity ranging from 3 to 18 meters per second. It is, of course, necessary in this case that the velocity $Us$ of the selective discharge gas in less than the velocity $Uj$ of gas jet stream from the gas jet stream injection opening 8 and the velocity $Ur$ of gas jet stream from the powdered raw material feed opening 10 but greater than the superficial gas velocity $Uo$ in the empty tower (i.e. $U_j > Ur > Us > Uo$).

On the other hand, in the case of the gas velocity $Un$ for feeding the solid seed material into the bed from the solid seed material feed pipe 16, a velocity $Un$ ranging from 10 to 20 meters per second will do.

In the invention process, as the gas fed through the perforated gas distributor for maintaining the fluidized state of the solid particles in the bed and gas for other purposes, an oxygen-containing gas, e.g. air, for burning the fuel is used.

The waste heat from the furnace can be used to preheat the powdered raw material or can also be used as a heat source of a steam generator or like in the chemical industry.

Thus, when in accordance with the present invention a powdered raw material consisting predominantly of alumina and silica and containing MgO in a range of 2–5 weight percent is burned in the presence of a specified seed material in a fluidized bed with the forced circulation of the solid particles, such troubles as the excessive agglomeration of the solid particles and the adhesion of the solid particles to the reactor wall are solved and it becomes possible to produce continuously practically spherical alumina-silica-containing particles containing mullite, which was difficult to achieve by the conventional methods.

In addition, it is possible according to the invention process to form at all times a practically constant amount of the liquid phase in the solid particles in the fluidized bed even though there is some variation in the burning temperature and the proportion of alumina and silica contained in the raw material. Hence, there is also the advantage that the sintering reaction of the raw material can be carried out over a very wide range of temperature of 1200°–1600° C. while forming at all times a stable fluidized bed without agglomeration of the particles taking place.

The alumina-silica-containing particles obtained by the process of this invention can be used for such as a heat carrier, catalyst carrier or refractory. Further, since they are practically spherical in shape, they demonstrate superiority in such properties as resistance to attrition and fluidity, especially in those instances in which they are used as media which move violently in an apparatus as in the case of solid particles in a fluidized bed in the production of olefins by the cracking of hydrocarbons employing a fluidized bed.

For further illustration of the present invention the following examples, and control and reference experiments will be given. Unless otherwise noted, the percentages in the foregoing examples and control and reference experiments are on a weight basis.

EXAMPLE 1

Air preheated to 450° C. was introduced into a furnace of identical type as that shown in the accompanying drawing having a diameter of 300 mm. and a height of 1500 mm., the air being introduced from the gas distributor having 50 holes of 4 mm. inside diameter, at the rate of 99.8 Nm³/hr. On the other hand, 30 kg. of solid seed material consisting of alumina-silica-containing solid particles of 0.5–1.5 mm. particle diameter and having the chemical composition indicated in table I were introduced to the furnace from the solid seed material feed pipe of 21.7 mm. inside diameter, while heavy oil A (according to Japanese Industrial Standard) was sprayed from the fuel injection nozzle of 21.7 mm. inside diameter after having been mixed internally with air of room temperature at the rate of 20 liter/hr. of the heavy oil A to 17.5 Nm³/hr. of the air. Thus a fluidized bed of about 1380° C. was formed.

Next, a mixed raw material of such a size that a residue on 170 mesh Tyler sieve is less than 10 percent consisting of a mixture of 33.3 percent quartzite, 61.4 percent aluminum oxide and 5.3 percent magnesium hydroxide and having the total composition as indicated in table I was introduced into the furnace, along with the subsequently described unsintered raw material carried over entrained with the waste gas from the top of the furnace, at the rate of 26.6 kg./hr. of the mixed raw material to 8.5 kg./hr. of the unsintered raw material, the introduction of the raw material being carried out from the powdered raw material feed opening of 30.2 mm. inside diameter along with air of room temperature fed at the rate of 13.3 Nm³/hr. and at a velocity of 18 meters/sec. On the other hand, as the seed material, the previously described alumina-silica-containing solid particles of 0.5–1.5 mm. diameter were introduced from the aforesaid solid seed material feed pipe at the rate of 6.5 kg./hr. along with 10 Nm³/hr. of air of room temperature, while as the gas jet stream, air preheated to 450° C. was introduced to the furnace at rate of 70.2 Nm³/hr. at a velocity of 19.5 m./sec. from the gas jet stream injection opening of inside diameter 65.6 mm. surrounding the aforesaid fuel injection nozzle. Thus the burning operation was carried out by maintaining the temperature of the fluidized bed at about 1380° C. At the same time, air preheated to 450° C. was introduced into the furnace from the particulate product selective discharge opening (hereinafter abbreviated to selective discharge opening) of inside diameter 47.4 mm. as the selective discharge gas at the rate of 531.2 Nm³/hr. and a velocity of 13.0 m./sec., whereupon the product alumina-silica-containing solid particles of practically spherical shape of 2.0-4.0 mm. particle diameter having the chemical composition indicated in table I were withdrawn continuously from the selective discharge opening selectively at the rate of 32.0 kg./hr.

The superficial gas velocity Uo in the empty tower was 6.1 m./sec. and the air excess factor (feed air/theoretical amount of air required) was 1.3.

On the other hand, the unsintered raw material carried over along with the waste gas from the top of the furnace amounted to 9.1 kg./hr., of which 8.5 kg./hr. was recovered by means of a cyclone (not shown in the drawing). The recovered unsintered raw material was recycled and reused. The operation was carried out continuously for 72 hours with no trouble at all.

method [J. Am. Chem. Soc., 60, 309, (1938)] was found to be below 1 m²/g.

EXAMPLES 2-7

A furnace identical to that of example 1 was employed, except that in example 2 the selective discharge opening was one of inside diameter 58.1 mm. and that in example 4 was one of inside diameter 43.5 mm. Powdered raw materials of such a size that a residue on 170 mesh Tyler sieve is less than 10 percent, which are indicated in Table II, were fed into the furnace in the state mixed with seed materials obtained by granulation of the foregoing raw materials with a fluidizing type granulator and the recovered unsintered raw materials. They were burned in the furnace under operating conditions indicated in

TABLE I

|  | Chemical constituents (percent) | | | | | |
|---|---|---|---|---|---|---|
|  | Ignition loss | Al₂O₃ | SiO₂ | MgO | Remainder | Total |
| Powdered raw material | 2.3 | 60.8 | 32.8 | 3.4 | 0.7 | 100 |
| Solid seed material | 0.5 | 61.8 | 33.0 | 4.0 | 0.7 | 100 |
| Product alumina-silica-containing solid particles | 0.3 | 62.0 | 33.5 | 3.8 | 0.4 | 100 |

When the mineral composition of the product alumina-silica-containing solid particles was measured by means of X-ray diffraction, the mineral composition was found to be principally $3Al_2O_3 \cdot 2SiO_2$ and $Al_2O_3 \cdot SiO_2$, and the strength $P/\pi r^2$ value of the product alumina-silica-containing solid particles (P: load in Kg at the time of breakage of particle of radius r cm.) was 450 kg./cm². Further, the specific surface area of the product alumina-silica-containing solid particles by the B.E.T.

table III with the results shown therein. The temperatures of air fed into the furnace were identical to those of example 1.

The operation was continuously carried out for 72 hours with no trouble whatsoever.

The mineral composition of the product alumina-silica-containing solid particles obtained in the several examples were predominantly $3Al_2O_3 \cdot 2SiO_2$ and $Al_2O_3 \cdot SiO_2$, and the surface area in accordance with the B.E.T. method was below 1 m²/g.

TABLE II

| | Class and proportion of each source in powdered raw materials used (percent) | | | Chemical composition of powdered raw material mixture (percent) | | | | | |
|---|---|---|---|---|---|---|---|---|---|
| Example | Al₂O₃ source | SiO₂ source | MgO source | Ignition loss | Al₂O₃ | SiO₂ | MgO | Remainder | Total |
| 2 | Aluminum oxide 65.3 | Quartzite 27.9 | Magnesium hydroxide 6.8 | 2.8 | 64.7 | 27.5 | 4.3 | 0.7 | 100 |
| 3 | Aluminum oxide 59.8 | Quartzite 34.4 | Magnesium hydroxide 5.8 | 2.5 | 59.2 | 33.9 | 3.7 | 0.7 | 100 |
| 4 | Aluminum oxide 55.4 | Quartzite 40.0 | Magnesium hydroxide 4.6 | 2.1 | 54.9 | 39.4 | 2.9 | 0.7 | 100 |
| 5 | Aluminum hydroxide 70.8 | Quartzite 25.2 | Magnesium hydroxide 4.0 | 26.1 | 46.1 | 24.8 | 2.5 | 0.5 | 100 |
| 6 | Aluminum oxide 62.4 | Quartzite 33.8 | Light calcined magnesia 3.8 | 0.7 | 61.8 | 33.3 | 3.5 | 0.7 | 100 |
| 7 | Kaolinite 94.1 | | Magnesium hydroxide 5.9 | 16.1 | 37.7 | 40.4 | 3.8 | 2.0 | 100 |

TABLE III

| Example | 2 | 3 | 4 | 5 | 6 | 7 |
|---|---|---|---|---|---|---|
| Operating conditions: | | | | | | |
| Particle diameter of solid seed material (mm.) | 0.5-1 | 1-2 | 2-4 | 1-2 | 1-2 | 1-2 |
| Amount fed of powdered raw material (kg./hr.) | 19.8 | 34.6 | 38.3 | 43.1 | 34.1 | 37.8 |
| Amount recycled of unsintered raw material (kg./hr.) | 7.7 | 9.9 | 11.2 | 9.4 | 9.6 | 9.4 |
| Amount fed of solid seed material (non-ignition base) (kg./hr.) | 10.6 | 6.2 | 5.7 | 7.6 | 6.0 | 6.7 |
| Burning temperature (° C.) | 1,250 | 1,360 | 1,500 | 1,360 | 1,360 | 1,360 |
| Amount fed of fuel (heavy oil A) (liters/hr.) | 20.5 | 23.0 | 24.8 | 23.0 | 23.0 | 23.0 |
| Air excess factor | 1.1 | 1.1 | 1.1 | 1.1 | 1.1 | 1.1 |
| Amount of air introduced (Nm³/hr.): | | | | | | |
| Air from gas distributor | 98.0 | 108.5 | 124.3 | 108.5 | 108.5 | 108.5 |
| Air from gas jet stream injection opening | 65.0 | 72.2 | 78.3 | 72.2 | 72.2 | 72.2 |
| Air from selective discharge opening | 25.2 | 28.8 | 26.0 | 28.8 | 28.8 | 28.8 |
| Air from fuel injection nozzle | 17.5 | 17.5 | 17.5 | 17.5 | 17.5 | 17.5 |
| Air from powdered raw material feed opening | 11.9 | 11.9 | 11.9 | 11.9 | 11.9 | 11.9 |
| Air from solid seed material feed pipe | 0.0 | 0.0 | 0.0 | 0.0 | 0.0 | 0.0 |
| Velocity of air introduced (m./sec.): | | | | | | |
| Air from gas jet stream injection opening | 18.0 | 20.0 | 21.7 | 20.0 | 20.0 | 20.0 |
| Air from selective discharge opening | 7.0 | 12.0 | 12.9 | 12.0 | 12.0 | 12.0 |
| Air from powdered raw material feed opening | 18.0 | 18.0 | 18.0 | 18.0 | 18.0 | 18.0 |
| Superficial gas velocity in the empty tower | 5.0 | 6.0 | 7.0 | 6.0 | 6.0 | 6.0 |
| Results: | | | | | | |
| Selective discharge rate of product particles (kg./hr.) | 29.4 | 39.1 | 42.3 | 37.0 | 39.3 | 36.8 |
| Diameter of product particles (mm.) | 0.5~2.0 | 1.5~3.4 | 3.3~5.0 | 1.5~3.4 | 1.5~3.4 | 1.5~3.4 |
| Unsintered raw material recovered by cyclone (kg./hr.) | 7.7 | 9.9 | 11.2 | 9.4 | 9.6 | 9.4 |
| Raw material escaped from flue (kg./hr.) | 0.2 | 0.6 | 0.8 | 0.6 | 0.6 | 0.6 |
| Chemical composition of product alumina-silica-containing solid particles (percent): | | | | | | |
| Ignition loss | 0.4 | 0.2 | 0.2 | 0.3 | 0.1 | 0.3 |
| Al₂O₃ | 66.0 | 60.8 | 56.2 | 62.9 | 62.4 | 45.3 |
| SiO₂ | 28.7 | 34.8 | 40.3 | 33.2 | 33.5 | 48.8 |
| MgO | 4.5 | 3.8 | 3.0 | 3.3 | 3.6 | 4.6 |
| Remainder | 0.4 | 0.4 | 0.3 | 0.3 | 0.4 | 1.0 |
| Total | 100 | 100 | 100 | 100 | 100 | 100 |
| Strength of the product alumina-silica-containing solid particles: $P/\pi r^2$ value (kg./cm²) | 550 | 660 | 350 | 390 | 550 | 715 |

CONTROLS 1-3

A furnace identical to that used in example 1 was employed, and powdered raw materials of such a size that a residue on 170 mesh Tyler sieve is less than 10 percent (indicated in Table IV), recycled unsintered raw material and seed material identical to that used in example 1 were burned as in example 1, except that above-mentioned materials were fed in the mixed state into the furnace, under the operating conditions indicated in table V. In the case where MgO was not added (Control 1) and where 1.0 percent by weight of MgO was added (Control 2) practically no growth of the particles took place in the bed. On the other hand, in the case where 7.6 percent of MgO was added (Control 3), the agglomeration of the solid particles in bed was set up within about one hour after the initiation of the operation. Therefore, it was impossible to continue the operation and the product particles could not be taken out. The operation in the case of either Control 1 or 2 was carried out for 24 hours. The operating conditions and the results obtained are shown in table V.

TABLE VI

| | |
|---|---|
| Type of thermal cracking furnace used. | Furnace having fluidized bed with the forced circulation flow of the solid particles (as disclosed in the specification of British Patent No. 1,146,016). |
| Method of providing heat to the reaction. | Partial combustion heat of crude oil. |
| Diameter of furnace (cm.) | 10. |
| Cracking temperature (° C.) | 840. |
| Amount fed of crude oil (liter./hr.) | 80. |
| Amount fed of steam (kg./hr.) | 23. |
| Operating time (hr.) | 72. |

| Solid particles used in bed | (1) Cement clinker | (2) Magnesia clinker | (3) Alumina-silica-containing particles (this invention) |
|---|---|---|---|
| Amount of particles held up in the bed (kg.) | 3.0 | 3.0 | 3.0 |
| Change in diameter of solid particles (mm.): | | | |
| Diameter at start of operation | 2-4 | 2-4 | 2-4 |
| Diameter at termination of operation | 0.5-3.4 | 1.0-3.4 | 1.2-4 |
| Amount of particles below 1.5 mm. in diameter at termination of operation (percent) | 35 | 30 | 0.2 |

TABLE IV

| | Class and proportion of each source in powdered raw materials used (percent) | | | Chemical composition of powdered raw material mixture (percent) | | | | | |
|---|---|---|---|---|---|---|---|---|---|
| Control | $Al_2O_3$ source | $SiO_2$ source | MgO source | Ignition loss | $Al_2O_3$ | $SiO_2$ | MgO | Remainder | Total |
| 1 | Aluminum oxide 64.9 | Quartzite 35.1 | Not added | 0.6 | 64.3 | 34.6 | 0 | 0.5 | 100 |
| 2 | Aluminum oxide 63.7 | Quartzite 34.7 | Magnesium hydroxide 1.6 | 1.1 | 63.1 | 34.2 | 1.0 | 0.6 | 100 |
| 3 | Aluminum oxide 57.1 | Quartzite 31.0 | Magnesium hydroxide 11.9 | 4.5 | 56.5 | 30.5 | 7.6 | 0.9 | 100 |

TABLE V

| Control | 1 | 2 | 3 |
|---|---|---|---|
| Operating conditions: | | | |
| Particle diameter of solid seed material (mm.) | 0.5-1.5 | 0.5-1.5 | 0.5-1.5 |
| Amount fed of powdered raw material (kg./hr.) | 39.5 | 39.5 | 39.5 |
| Amount recycled of unsintered raw material (kg./hr.) | 14.0 | 13.9 | 5.0 |
| Amount fed of solid seed material (non-ignition base) (kg./hr.) | 6.9 | 6.9 | 6.9 |
| Burning temperature (° C.) | 1,360 | 1,360 | 1,360 |
| Amount fed of fuel (heavy oil A) (liters/hr.) | 23.0 | 23.0 | 23.0 |
| Air excess factor | 1.1 | 1.1 | 1.1 |
| Amount of air introduced (Nm.³/hr.): | | | |
| Air from gas distributor | 108.5 | 108.5 | 108.5 |
| Air from gas jet stream injection opening | 72.2 | 72.2 | 72.2 |
| Air from selective discharge opening | 28.8 | 28.8 | 28.8 |
| Air from fuel injection nozzle | 17.5 | 17.5 | 17.5 |
| Air from powdered raw material feed opening | 11.9 | 11.9 | 11.9 |
| Air from seed feed pipe | 0.0 | 0.0 | 0.0 |
| Velocity of air introduced (m./sec.): | | | |
| Air from gas jet stream injection opening | 20.0 | 20.0 | 20.0 |
| Air from selective discharge opening | 12.0 | 12.0 | 12.0 |
| Air from powdered raw material feed opening | 18.0 | 18.0 | 18.0 |
| Superficial gas velocity in the empty tower | 6.0 | 6.0 | 6.0 |
| Results: | | | |
| Selective discharge rate of product particles (kg./hr.) | 7.0 | 9.2 | (¹) |
| Diameter of product particles (mm.) | 0.5-1.5 | 0.5-1.7 | (¹) |
| Unsintered raw material escaped from flue (not recovered by cyclone) (kg./hr.) | 53.4 | 50.9 | (¹) |
| Chemical composition of resulting solid particles (percent): | | | |
| Ignition loss | 0.4 | 0.4 | (¹) |
| $Al_2O_3$ | 61.9 | 61.9 | (¹) |
| $SiO_2$ | 33.0 | 33.2 | (¹) |
| MgO | 4.0 | 3.8 | (¹) |
| Remainder | 0.7 | 0.7 | (¹) |
| Total | 100 | 100 | (¹) |
| Strength of resulting solid particles $P/\pi r^2$ value (kg./cm.²) | 400 | 400 | (¹) |

¹ Agglomeration set up and product particles could not be taken out.

REFERENCE EXPERIMENT

The resistance to attrition of the alumina-silica-containing solid particles obtained in example 1 and also that of the particles of cement clinker and particles of magnesia clinker were investigated by conducting the thermal cracking of crude oil for 72 hours in a thermal cracking furnace of the fluidized bed type with the forced circulation flow of the solid particles using as heat carrier (solid particles in the bed) each of the foregoing particles. The conditions of operation and results obtained are shown in table VI.

It is seen from the results given in table VI that in the case of the alumina-silica-containing solid particles obtained in accordance with the present invention those particles of below 1.5 mm. in diameter amounted to only 0.2 percent even after operating for 72 hours. Hence, it is apparent that the alumina-silica-containing solid particles of this invention possess excellent properties when used as a heat carrier.

We claim:

1. A process for producing spherical alumina-silica solid particles containing magnesia which comprises introducing a powdered raw material (A) containing alumina and silica in a proportion of 40–80 weight percent and 15–58 weight percent, respectively, and a compound selected from the group consisting of magnesia and magnesium compounds capable of forming magnesia under burning conditions, in an amount of 2–5 weight percent, calculated as MgO, to a fluidized bed with the forced circulation flow of the solid particles, in the presence of a solid seed material (B) having a particle diameter of one-tenth to two-thirds that of the product particles and consisting essentially of silica, alumina and magnesia; burning said powdered raw material (A) and said seed material (B) in said fluidized bed at a temperature of 1200–1600° C. to coat said seed material (B) with said powdered raw material (A); and thereafter recovering the resulting solid product particles of predominantly mullite having a particle diameter of 0.5–10 mm.

2. The process of claim 1 wherein said powdered raw material (A) is introduced at the rate of one to ten parts by weight to one part by weight of said seed material (B).

3. A process for producing spherical alumina-silica solid particles containing magnesia which comprises feeding to a fluidized bed a solid seed material having a particle diameter of one-tenth to two-thirds that of the product particles and consisting essentially of silica, alumina and magnesia, a powdered raw material containing alumina and silica in a proportion of 40–80 weight percent and 15–58 weight percent, respectively, and a compound selected from the group consisting of magnesia and magnesium compounds capable of forming magnesia under burning conditions, in an amount of 2–5 weight percent, calculated as MgO; feeding an oxygen-containing gas as a fluidizing gas through a perforated gas distributor disposed at the bottom of said fluidized bed at a velocity sufficient to fluidize the solid particles; effecting the forced circulation flow of the solid particles in said fluidized bed by introducing an oxygen-containing gas jet stream from an opening provided in the central part of said distributor at a linear velocity $U_j$ greater than the superficial gas velocity $Uo$ in the empty tower; introducing and burning a liquid fuel in said fluidized bed to burn the solid particles at a temperature of 1200–1600° C. to thereby coat the seed material with said powdered raw material; and thereafter recovering the resulting solid particles of predominantly mullite having a particle diameter of 0.5–10 mm.

4. The process of claim 3 wherein said oxygen-containing gas is air.

5. The process of claim 3 wherein the superficial velocity $Uo$ in the empty tower is in the range of 2–10 meters per second and the linear velocity $U_j$ of the gas jet stream is in the range of 15–30 meters per second.

6. The process of claim 3 wherein the ratio of the amount $V_f$ of flow of the fluidizing gas to the amount $Vo$ of flow of the total gas fed to the fluidized bed, $V_f/Vo$ is between 0.3 and 0.6, and the ratio of amount $V_j$ of flow of the gas jet stream to $Vo$, i.e. $V_j/Vo$ ranges between 0.2 and 0.4.

7. The process of claim 1 wherein said powdered raw material (A) and seed material (B) are burned by introducing a liquid fuel into the fluidized bed together with an oxygen-containing gas and burning said fuel at a temperature of 1200–1600° C.

* * * * *